United States Patent [19]

Seastrand, Jr.

[11] 4,160,952

[45] Jul. 10, 1979

[54] SPACE DIVERSITY RECEIVER WITH COMBINED STEP AND CONTINUOUS PHASE CONTROL

[75] Inventor: Kurt L. Seastrand, Jr., Andover, Mass.

[73] Assignee: Bell Telephone Laboratories, Incorporated, Murray Hill, N.J.

[21] Appl. No.: 905,156

[22] Filed: May 12, 1978

[51] Int. Cl.² .............................................. H04B 7/04
[52] U.S. Cl. ..................................... 325/369; 325/476
[58] Field of Search ..................... 325/369, 31, 41, 56, 325/60, 302, 304, 305, 306, 365, 366, 367, 476; 343/100 AD, 100 CS, 100 CL, 205, 206; 328/155, 133; 324/83 R; 179/15 AN

[56] References Cited

U.S. PATENT DOCUMENTS

| | | | |
|---|---|---|---|
| 2,786,133 | 3/1957 | Dyke | 325/31 |
| 2,955,199 | 10/1960 | Mindes | 325/369 |
| 3,582,790 | 6/1971 | Curtis | 325/369 |
| 4,075,566 | 2/1978 | D'Arcangelis | 325/369 |

OTHER PUBLICATIONS

Diversity Reception and Automatic Phase Correction, by L. Lewin, The Proceeding of the IEEE, vol. 109 Part B. No. 46, Jul., 1962.

Primary Examiner—Benedict V. Safourek
Assistant Examiner—Tommy F. Chin
Attorney, Agent, or Firm—Sylvan Sherman

[57] ABSTRACT

Prior art circuits used in space diversity systems for combining the two received signals employ either continuously variable phase shifters, which have return-to-zero problems, or 90 degree phase steppers which combine the signals to within ±45 degrees. Both of these limitations are avoided by the use of the combination of a continuously variable phase shifter (14) and a 90 degree phase stepper (13). Control means (19, 20) are provided for actuating the stepper when the phase shift introduced by the variable phase shifter reaches a prescribed limit.

5 Claims, 6 Drawing Figures

SPACE DIVERSITY RECEIVER WITH COMBINED STEP AND CONTINUOUS PHASE CONTROL

TECHNICAL FIELD

This invention relates to space diversity receivers and, in particular, to circuit arrangements for combining, in phase, the two signals received in such systems.

BACKGROUND OF THE INVENTION

It is well known that radio waves, propagating from a transmitter to a receiver, can follow a plurality of different paths, and that the relative phases of the different waves arriving at the receiving antenna can be such as to destructively interfere, causing what is commonly referred to as a fade. In order to reduce the opportunity for this to occur, the so-called "space diversity" system has been developed using two, spaced antennas to feed a common receiver. The theory underlying the use of two spaced-apart antennas is that there is less likelihood that a fade will occur at both antennas at the same time. In the simplest system, means are provided to disconnect the receiver from one antenna as soon as the received signal level falls below a predetermined threshold and to connect the receiver to the second antenna. In this so-called "blind switching," it is assumed that the signal received by the second antenna is stronger than that received by the first antenna. In a more sophisticated system, the signals from the two antennas are combined at radio frequency instead of switching between the two. This eliminates amplitude and phase jumps associated with the switching operation, and has the added advantage of delivering a larger amplitude signal to the receiver. However, such a system requires the use of dynamic phase correction to compensate for variations in the relative phase of the two signals caused by changes in the path lengths traversed by them. In one such system, described in U.S. Pat. No. 2,786,133, a single, continuously adjustable phase shifter is included in one of the antenna wavepaths and is automatically adjusted so that the wave from the one antenna has the proper phase to combine with the wave from the other antenna. U.S. Pat. No. 3,582,790 shows, in greater detail, a means for combining the two received signals and for isolating the two antennas from each other. The circuit includes a first phase shifter which shifts the phase of one of the input signals to bring it into quadrature relationship with the other. The quadrature related signals are combined in a first hybrid coupler to produce a pair of equal amplitude signals. The phase of one of the two signals is then shifted 90 degrees by a second phase shifter so as to bring the two signals in phase. The two equal, in-phase signals are then combined in a second hybrid coupler to produce a single output signal whose total power is equal to the sum of the powers of the two received signals.

Both of these systems seek to track the two signals continuously and do so by means of continuously variable phase shifters. The problem with such phase shifters is that in order to go from maximum phase shift back to zero, they must go through all phase values therebetween. To illustrate the problem, consider two waves whose relative phase difference is slowly increasing. As the phase increases, it will eventually reach 360 degrees at which point the two signals are again in phase. However, a phase shifter such as the type illustrated in U.S. Pat. No. 2,786,133 does not ease past its maximum phase shift to zero phase shift but, instead, must be reset by going completely through its entire range of phase shifts from its maximum setting to its minimum setting, causing a sudden fluctuation in the amplitude of the output signal, including the possibility of signal cancellation.

This return-toward-zero problem is avoided by using stepping phase shifters of the types disclosed in copending applications Ser. Nos. 578,528 and 878,561, filed concurrently on Feb. 17, 1978, wherein the signal phase can be advanced or retarded continuously in 90 degree steps. However, one limitation of this approach is that phase correction is made in discrete increments and, hence, is only approximate. For example, the two signals can be as much as 45 degrees out of phase, resulting in some signal loss due to phase error.

A second difficulty resides in the manner in which the phase shifter control signal is derived. Typically, a small phase modulation is impressed upon the signal in one of the two antenna circuits, as described, for example, in the article "Diversity Reception and Automatic Phase Correction" by L. Lewin, pp. 295–304, *The Proceedings of The Institution of Electrical Engineers*, July 1962. The phase modulation produces an amplitude modulation of the composite signal obtained when the two signals are combined. The fundamental and second harmonic of this amplitude modulation is then detected by the receiver's AGC circuit and used to control the phase shifter. The problem with this approach is that it is often difficult to accurately detect the relatively small second harmonic component in the presence of noise.

SUMMARY OF THE INVENTION

The above-noted problems and limitations are avoided in a space diversity system characterized in that both a 90 degree phase stepper and a continuously variable phase shifter are included in the antenna circuits. The two phase shifters produce a total phase shift for combining the two received signals in phase in response to only the fundamental component of the phase modulating signal detected by the receiver AGC circuit.

One advantage of using the combination of a stepper and a continously variable phase shifter is that it provides a means for combining the two antenna signals in phase, without encountering the return-toward-zero problem.

A second advantage is that only the fundamental of the phase modulation is required to control both phase shifters. Hence, it is no longer necessary to detect the second harmonic.

DETAILED DESCRIPTION

Figure 1:
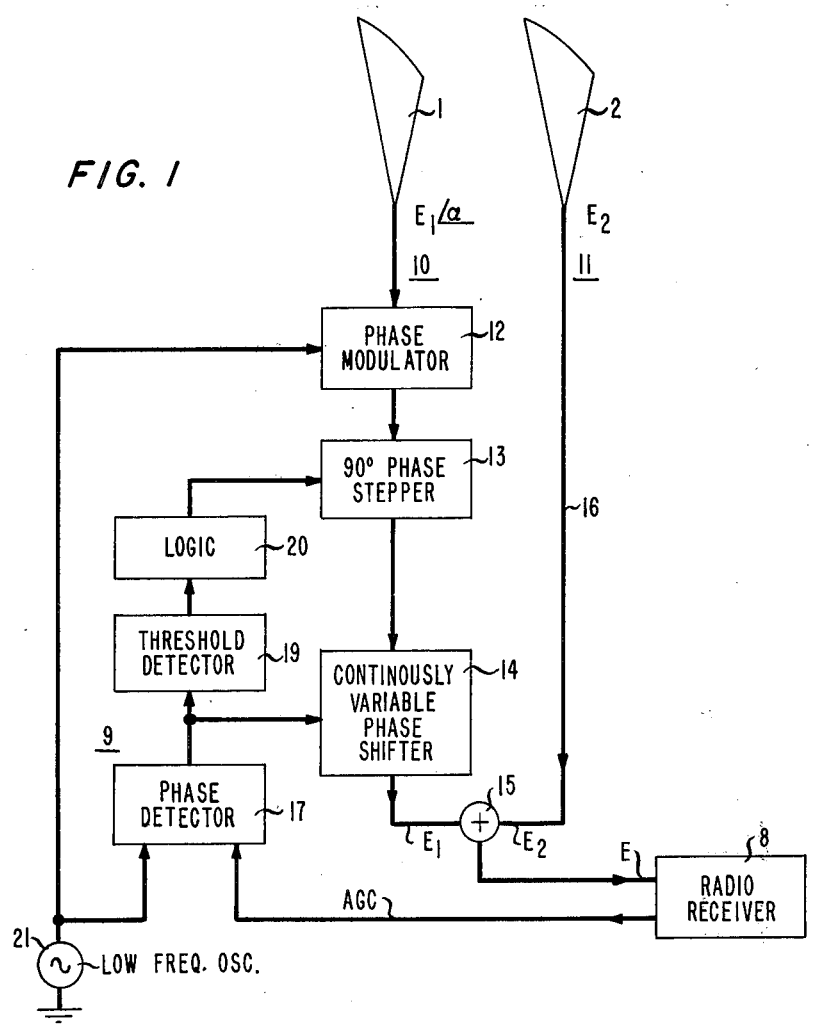
FIG. 1 shows, in block diagram, a network arrangement for combining signals in a space diversity system in accordance with the present invention.

Referring to the drawings, FIG. 1 shows, in block diagram, a network arrangement for combining signals in a space diversity system in accordance with the present invention. The network includes a pair of antenna circuits 10 and 11 and an associated control circuit 9. One of the antenna circuits 10 comprises an antenna 1, a phase modulator 12, a 90 degree phase stepper 13, and a continuously variable phase shifter 14. The second antenna circuit 11 comprises an antenna and a transmission path 16.

The signals in the two antenna circuits are combined by means of a signal combiner 15 whose output is coupled to a radio receiver 8.

The phase shifters in antenna circuit 10 are controlled by control circuit 9 which is responsive to the automatic gain control (AGC) signal produced in the radio receiver. The control circuit in the illustrative embodiment comprises a phase detector 17, a threshold detector 19 and a logic circuit 20.

In operation, a signal $E_1$ received by antenna 1 is phase modulated in modulator 12 by a relatively low frequency sinusoidal signal (i.e., between 0–40 Hz) derived from a low frequency oscillator 21. Signal $E_1$, thus modulated, and a signal $E_2$ received by antenna 2 are then combined by signal combiner 15 and the resulting signal E coupled to the receiver.

Figure 2:
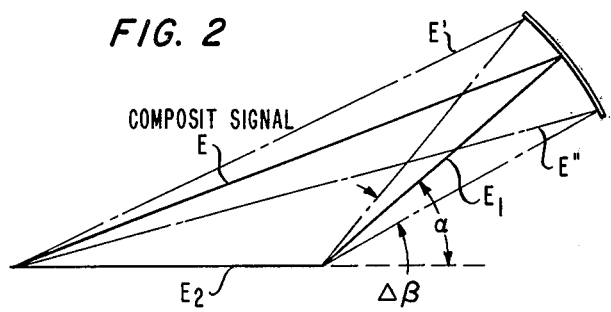
FIG. 2 is a vector diagram showing the effect upon the combined signal of phase modulating one of the two received signals.

In the absence of any phase shift introduced by the two phase shifters 13 and 14, the received signals $E_1$ and $E_2$ are at some relative phase $\alpha$ with respect to each other, as shown by the vector diagram in FIG. 2. The resulting composite signal at the output of signal combiner 15 is given by vector E, whose magnitude is less than the algebraic sum of signals $E_1$ and $E_2$.

The effect upon the composite signal E of the phase modulation $\Delta\beta$ impressed upon signal $E_1$ is indicated by the dashed lines in FIG. 2. In addition to changing its relative phase, the phase modulation causes the amplitude of the composite signal to vary between a maximum of E" and a minimum of E'. It is this amplitude modulation ($\Delta E = E'' - E'$) of the composite signal that is sensed by the receivers AGC circuit and detected by the synchronous detector 17.

Figure 3:
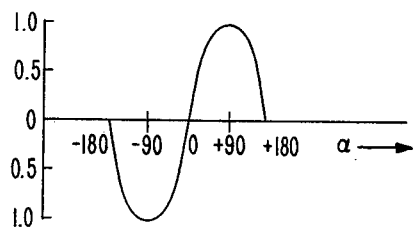
FIG. 3 is a curve showing the variation in the magnitude of the amplitude modulation produced on the combined signal as a function of the phase of the two received signals.

The optimum condition obtains when signals $E_1$ and $E_2$ are in phase. When this occurs, there is substantially no amplitude modulation produced by the phase modulation of signal $E_1$ (i.e., $E \approx E'' = E'$) and, hence, no correcting signal is produced at the output of detector 17. As the angle $\alpha$ between the two signals increases, the degree of amplitude modulation $\Delta E$ of the composite signal (i.e., $E'' - E'$) increases, reaching a maximum at about $\alpha = 90$ degrees, as indicated in FIG. 3. Thus, the fundamental of the amplitude modulation, as detected by the phase detector, is a measure of the phase difference $\alpha$, and can be used as a correcting or control signal for the phase shifters 12 and 13. However, inasmuch as the correcting signal decreases beyond 90 degrees, it is clear that a continuously variable phase shift can only be utilized over the range between zero and ±90 degrees. More specifcially, the range is advantageously limited to slightly in excess of ±45 degrees, i.e., ±55. Additional phase shift, as required, is provided by other means. In accordance with the present invention, the other means is the 90 degree phase stepper 13.

Thus, in accordance with the present invention, the fundamental component of the phase modulating signal is detected by the receiver AGC circuit and phase detector 17. This signal is then applied to phase shifter 14, wherein the indicated phase correction is produced to minimize $\alpha$. The detected signal is also coupled to threshold detector 19 which responds only when the control signal exceeds a specified level. For example, as $\alpha$ increases in a given sense, the control signal applied to phase shifter 14 also increases so as to produce a compensating phase shift $\theta$ of the opposite sense, i.e., $\theta \approx -\alpha$. The resulting phase difference between the two antenna signals at the input to the signal combiner 15 is thereby reduced to some small error angle $\Delta\alpha$. However, as $\alpha$ increases beyond the range of the continuously variable phase shifter, the control signal exceeds the threshold level of threshold detector 19, causing the phase stepper to introduce an additional 90 degrees of phase shift in antenna circuit 10. Momentarily, the relative phase of the signals at the input to the signal combiner goes from $\Delta\alpha$ to $-90 + \Delta\alpha$, causing a reversal in the sign of the control signal, and a corresponding change in the phase shift $\theta$ introduced by phase shifter 14 from $-55$ degrees to $\theta = -(\alpha - 90)$ degrees. If $\alpha$ continues to increase, causing $\theta$ to again reach its maximum, an additional 90 degree step is introduced. Thus, by means of a combination of continuous phase shift and incremental phase shift, the two received signals are combined substantially in phase without the return-toward-zero problem encountered in the prior art phase combining arrangements.

Figure 4:
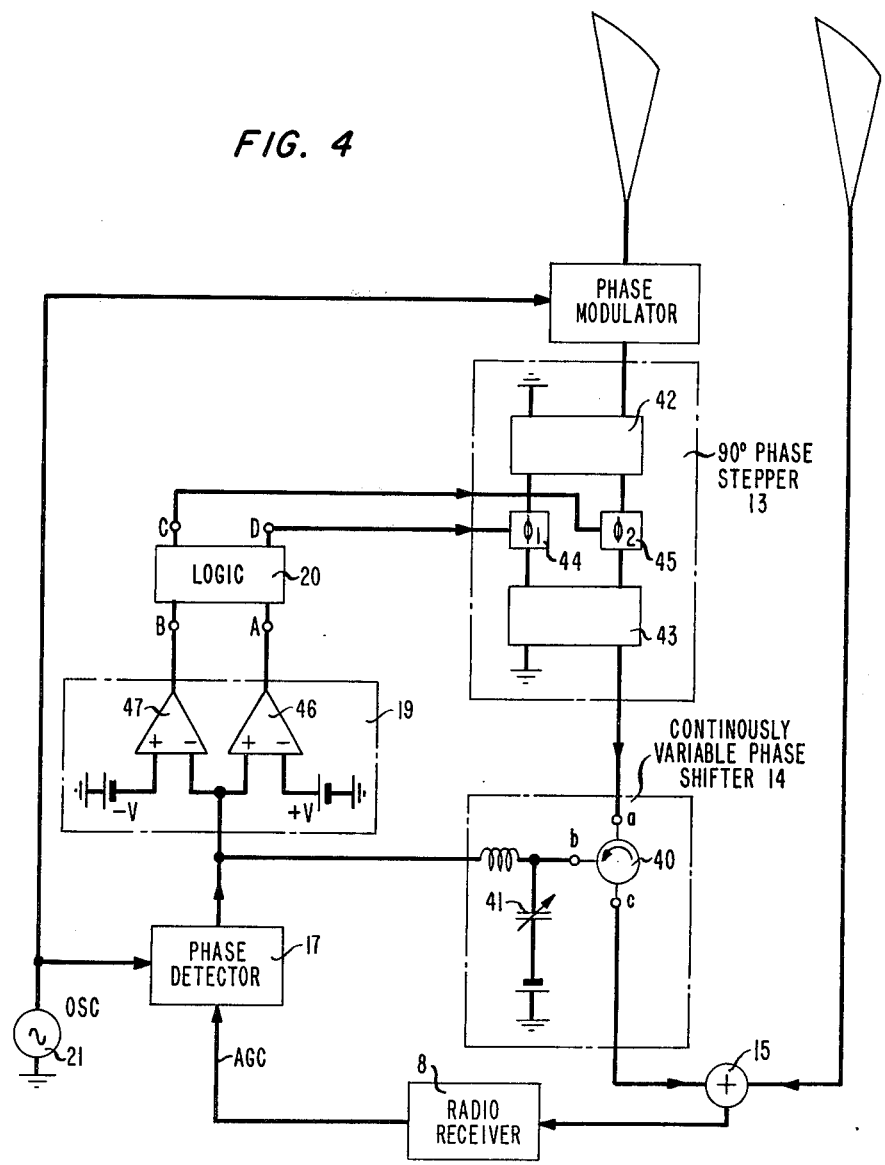
FIGS. 4 and 5 show illustrative circuit details of some of the circuit components identified in the block diagram of FIG. 1.
Figure 5:
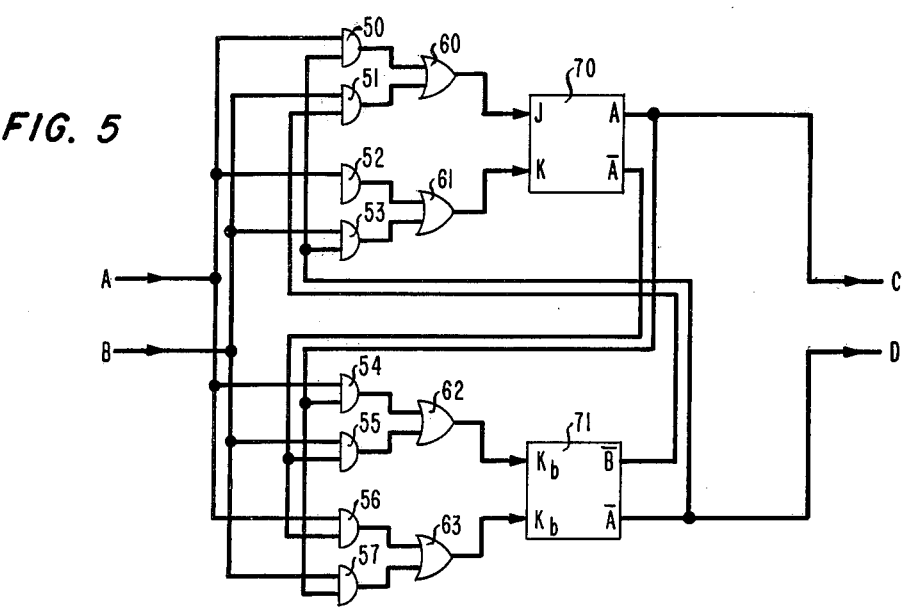

FIGS. 4 and 5, included for purposes of illustration, show circuit details of some of the circuit components identified in the block diagram of FIG. 1. By way of example, the continuously variable phase shifter 14 comprises a three-port circulator 40 whose input port a is connected to the phase stepper 13 and whose output port c is connected to signal combiner 15. Intermediate port b is connected to a back-biased varactor diode 41 along with the output signal from phase detector 17. In operation, variations in the magnitude and polarity of the signal derived from phase detector 17 produce changes in the effective capacitance of diode 41 which, in turn, change the phase of the signal as it propagates through phase shifter 14.

Phase stepper 13, illustrated in FIG. 4 and described by H. Miedema in his copending U.S. application Ser. No. 878,528, filed Feb. 17, 1978, comprises a 3 dB, 90 degree hybrid coupler 42 and a 3 dB, 180 degree hybrid connected in tandem by means of a pair of phase shifters 44 and 45, each of which introduces a relative phase shift of either zero or 180 degrees between signals in the two interconnecting wavepaths.

Table 1 shows the four phase states of the output signal from phase stepper 13 as a function of the phase shifts $\theta_1$ and $\theta_2$ introduced by phase shifters 44 and 45.

TABLE I

| $\theta_1$ | $\theta_2$ | Output Signal Phase |
|---|---|---|
| 0 degrees | 0 degrees | 45 degrees |
| 0 degrees | 180 degrees | 135 degrees |
| 180 degrees | 180 degrees | 225 degrees |
| 180 degrees | 0 degrees | 315 degrees |

It will be noted that the phase of the output signal changes, in either direction, in 90 degree increments whenever there is a change in either $\theta_1$ or $\theta_2$. Accordingly, the truth table for the phase stepper control signals C–D provided by logic circuit 20 is given by Table II.

TABLE II

| Present State | | Future State | | | |
|---|---|---|---|---|---|
| | | Phase Advance | | Phase Retard | |
| C | D | C | D | C | D |
| 0 | 0 | 0 | 1 | 1 | 0 |
| 0 | 1 | 1 | 1 | 0 | 0 |
| 1 | 1 | 1 | 0 | 0 | 1 |
| 1 | 0 | 0 | 0 | 1 | 1 |

To achieve the above set of control signals, the truth table for the logic circuit is as given by Table III.

TABLE III

| | | Present State | | Future State | |
|---|---|---|---|---|---|
| A | B | C | D | C | D |
| 0 | 0 | 0 | 0 | 0 | 0 |
| 0 | 0 | 0 | 1 | 0 | 1 |
| 0 | 0 | 1 | 1 | 1 | 1 |
| 0 | 0 | 1 | 0 | 1 | 0 |
| 1 | 0 | 0 | 0 | 0 | 1 |
| 1 | 0 | 0 | 1 | 1 | 1 |
| 1 | 0 | 1 | 1 | 1 | 0 |
| 1 | 0 | 1 | 0 | 0 | 0 |
| 0 | 1 | 0 | 0 | 1 | 0 |
| 0 | 1 | 0 | 1 | 0 | 0 |
| 0 | 1 | 1 | 1 | 0 | 1 |
| 0 | 1 | 1 | 0 | 1 | 1 |

A logic circuit obeying the above truth table, shown in FIG. 5, comprises an array of AND gates 50 through 57, OR gates 60 through 63, and JK flip-flops 70 and 71.

An illustrative threshold detector 19 for supplying the logic circuit input signals A and B comprises a pair of high gain differential amplifiers 46 and 47 arranged as shown in FIG. 4. The phase detector output is connected to the plus terminal of amplifier 46 and to the minus terminal of amplifier 47. A positive reference voltage $+V$ is connected to the minus terminal of amplifier 46 and a negative reference voltage $-V$ is connected to the plus terminal of amplifier 47. The truth table for the threshold detector is as given by Table IV.

TABLE IV

| Input Voltage | Output Signal | |
|---|---|---|
| $V_c$ | A | B |
| $V_c > V$ | 1 | 0 |
| $-V < V_c < V$ | 0 | 0 |
| $V_c < -V$ | 0 | 1 | where V and $-V$ are the threshold voltages for actuating the phase stepper.

It will be understood that the particular circuits shown in FIGS. 4 and 5 are merely illustrative of the variety of circuits that can be devised to perform the indicated circuit functions.

Figure 6:
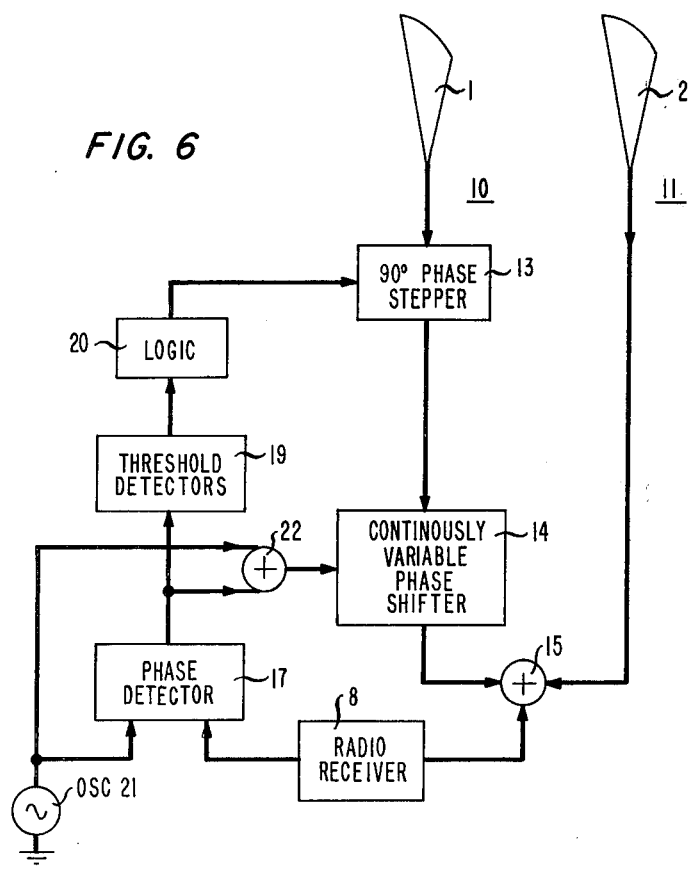
FIG. 6 is a modification of the network arrangement of FIG. 1.

FIG. 6 shows a slight modification of the embodiment of FIG. 1 relating to the manner in which the signal in antenna circuit 10 is phase modulated. In this modified embodiment, the separated phase modulator 13 is omitted. Instead, the local oscillator signal is added to the output signal from phase detector 17 by means of signal combiner 22, and the combined signal coupled to the continuously variable phase shifter 14. In all other respects the operator of the embodiment of FIG. 6 is as described hereinabove.

I claim:

1. In a space diversity system, a receiver including:
   first and second antenna circuits (10, 11);
   means (12, 21) for phase modulating the signal in one of said antenna circuits (10);
   means (15) for combining the signals in said antenna circuits (10, 11);
   and means (8, 17, 21) for detecting the amplitude modulation produced in said combined signals by said phase modulation;
   characterized in that:
   said one antenna circuit (10) includes a 90 degree phase stepper (13) and a continuously variable phase shifter (14);
   and in that said receiver further includes a control circuit (9) for controlling the combined phase shift produced by the phase stepper (13) and the variable phase shifter (14) in response to the detected amplitude modulation.

2. The receiver according to claim 1 characterized in that:
   said control circuit (9) includes:
   a phase detector (17) for detecting the fundamental frequency component of the phase modulation impressed upon the signal in the one antenna circuit (10);
   means for coupling the output from said phase detector to said variable phase shifter (14) and to a threshold detector (19) for sensing when the magnitude of said detected fundamental frequency component exceeds a prescribed level;
   and logic means (20) for activating the phase stepper (13) in response to the output control signal from said logic means (20).

3. The receiver according to claim 1 characterized in that:
   said phase modulating means includes an oscillator (21), and a separate phase modulator (12) disposed within one of the antenna circuits (10).

4. The receiver according to claim 1 characterized in that:
   said phase modulating means includes an oscillator (21), and a signal combiner (22) for combining the signal from said oscillator and the output signal from the phase detector (17) and for coupling the combined signal to said variable phase shifter (14).

5. The receiver according to claim 1 characterized in that:
   the combined phase shift produced by the phase stepper (13) and the variable phase shifter (14), in response to the control circuit, produces a substantially in phase relation between the signals in the two antenna circuits (10), and (11) at the input to the signal combiner (15).

* * * * *